UNITED STATES PATENT OFFICE.

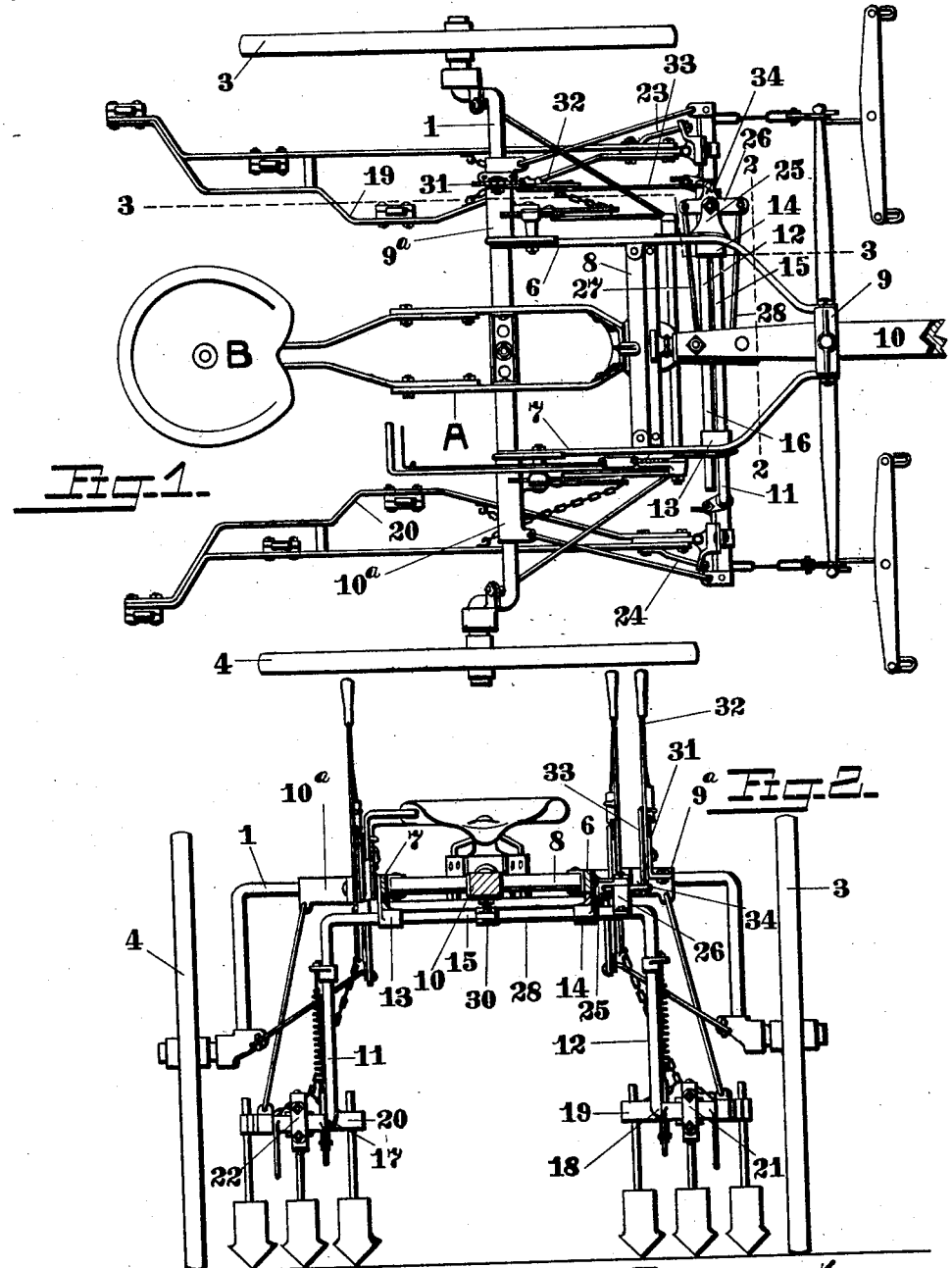

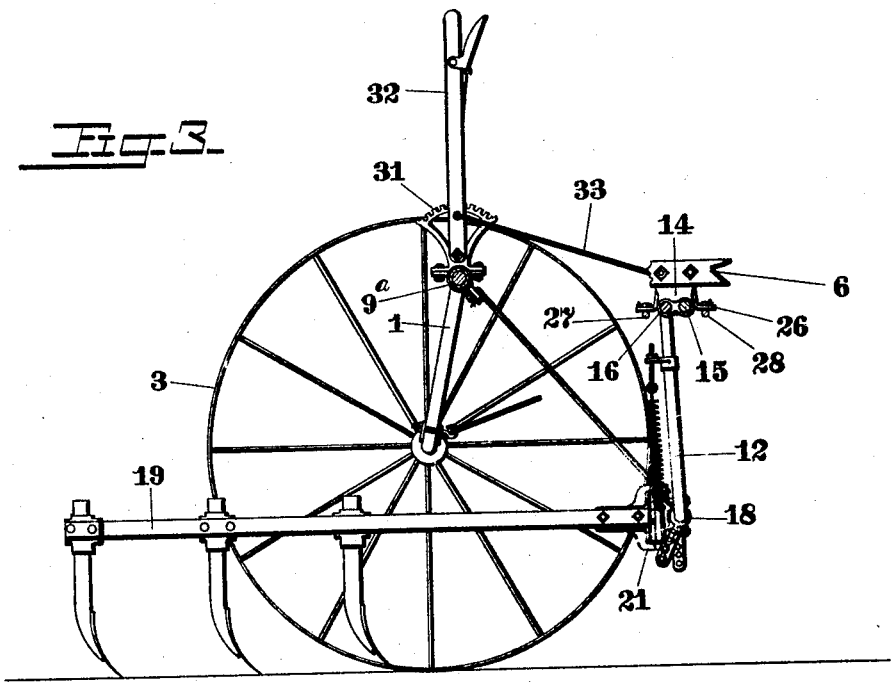
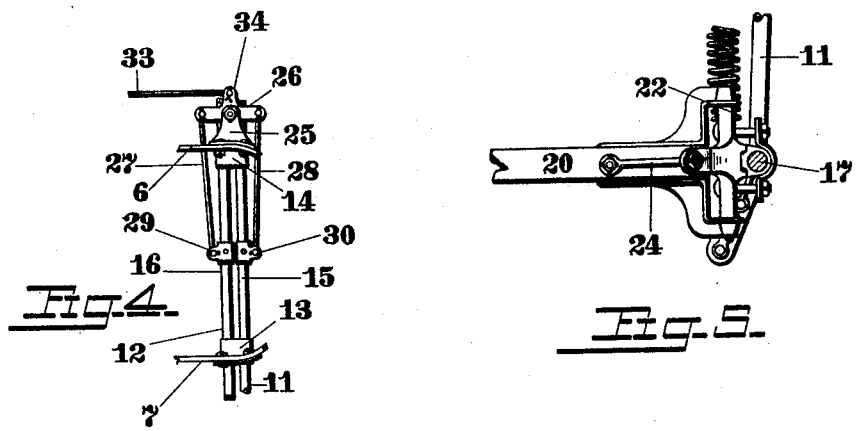

WESLEY A. PAUL, OF MOLINE, ILLINOIS, ASSIGNOR TO DEERE & COMPANY, OF MOLINE, ILLINOIS, A CORPORATION OF ILLINOIS.

CULTIVATOR.

1,318,582.  Specification of Letters Patent.  Patented Oct. 14, 1919.

Application filed June 10, 1914, Serial No. 844,318. Renewed March 17, 1917. Serial No. 155,574.

*To all whom it may concern:*

Be it known that I, WESLEY A. PAUL, a citizen of the United States, residing at Moline, in the county of Rock Island and State of Illinois, have invented certain new and useful Improvements in Cultivators, of which the following is a specification, reference being had therein to the accompanying drawing.

My invention relates to wheeled cultivators, and more particularly to certain features of adjustment of the cultivator rigs. The object of my invention is to provide adjustments to enable an operator of the machine to accommodate the cultivation to varying conditions of growth as will be fully described and claimed in the following specification.

Referring to the drawings in which similar numerals indicate identical parts—

Figure 1 is a plan view of a wheeled cultivator embodying my invention. Fig. 2 is a sectional view on the line 2—2 and looking to the rear. Fig. 3 is a section on the line 3—3 of Fig. 1, and Figs. 4 and 5 are details.

An arch axle 1 has journaled on its crank ends supporting wheels 3 and 4; a frame, comprising side bars 6, 7, and a cross brace 8 rigidly secured thereto, is mounted on the crank axle 1, the forward ends of the side bars 6, 7 converging and secured to a casting 9 on a draft pole 10, and the rearward ends secured to sleeves 9ª, 10ª on the arch axle 1. A seat frame A is suitably supported on the axle 1, and has thereon a seat B so situated that the operation of my invention is easily and readily effective. Supported in bearings 13, 14, on the side bars 6, 7 are members 11 and 12 forming a divided arch; the upper horizontal portion 15, 16 of the members 11, 12, are parallel and adapted to slide in the bearings 13, 14; the lower ends 17, 18, of the members 11, 12, are bent outwardly to form supports for cultivating rigs 19, 20 which are connected to couplings 21, 22, rotatable thereon so that the cultivating rigs can be swung in a vertical direction, horizontal swinging movement being prevented by braces 23, 24, secured one to each of the cultivating rigs 19, 20, and to the respective couplings to which the rigs are connected.

Pivotally mounted on a bracket 25, preferably integral with the bearing 14 and extending outwardly beyond the side bar 6, is a tri-armed casting 26, to opposite arms of which are pivotally connected rods 27, 28; the rods 27, 28 extend toward the center of the machine, the rod 27 being pivotally connected to a collar 29 on the member 12, and the rod 28 being similarly connected to a collar 30 on the member 11. A toothed segment 31 is rigidly secured to the sleeve 9ª and has a lever 32 pivotally connected to its base, the lever 32 being provided with the ordinary form of latch to engage with the teeth of the segment; a rod 33 connects the lever 32 with the central and outwardly extending arm 34 of the pivoted casting 26.

My device is particularly applicable to conditions in which uniformity of cultivation is essential and to that end the cultivating rigs 19, 20 are adjustable toward or from each other and at all times are parallel to the wheels 3 which have no lateral swinging adjustment.

To spread the cultivating rigs 19, 20, farther apart I move the lever 32 forwardly and the latter, through the connecting rod 33, rocks the casting 26 so that the members 11, 12 of the arch are moved outwardly from the center of the machine carrying with them the cultivating rigs 19, 20, because of the connection of the casting 26 to the collars 29, 30 by the rods 12, 11. A rearward movement of the lever 32 will result in the cultivating rigs being brought closer together, the engagement of the latch on the lever 32 with the teeth of the segment 31 holding the parts in any position to which they may be adjusted.

By means of the adjustment just described the cultivator is readily adapted to cultivation between rows of varying widths, and the adjustment desired is quickly effected because of the simplicity of my invention, and its accessibility from the driver's seat.

What I claim is—

1. In a wheeled cultivator, the combination of an axle, a frame supported on the axle, a divided arch comprising two members having horizontal laterally disposed portions in parallel relation to each other and slidable in bearings on the frame, a cultivating rig pivotally connected to each arch member and in permanent parallel relation with the wheels, and means to move said arch members laterally to vary the distance between the cultivating rigs.

2. In a wheeled cultivator, the combination of an arched axle, a main frame, a divided arch comprising two members having horizontal laterally disposed portions in parallel relation to each other and slidable in bearings on the main frame, a cultivating rig connected to each arch member, a horizontally disposed rocking member supported centrally on a vertical pivot on the main frame, a connection from each end of said rocking member respectively, an outwardly extending arm on the rocking member, and a lever connected with said arm and operable to rock said member to move the arch members in opposite directions, whereby the cultivating rigs are moved bodily toward or from each other.

3. In a wheeled cultivator, the combination of an arched axle, a main frame supported on the axle, a divided arch comprising duplicate members having horizontal laterally disposed portions in parallel relation to each other and slidable in bearings on the main frame, a cultivating rig connected to each arch member, a tri-armed casting pivotally supported on the main frame and adapted to swing horizontally, rods connected to oppositely disposed arms of said casting, each of said rods connected to a collar on each of the arch members, a pivoted lever supported on the axle, and a rod connecting said lever with a laterally disposed arm of said casting, said lever adapted to be rocked to adjust said arch members in opposite directions, whereby the cultivating rigs are moved bodily toward or from each other.

In testimony whereof I affix my signature in presence of two witnesses.

WESLEY A. PAUL.

Witnesses:
  W. G. DUFFIELD,
  JESSIE L. SIMSER.

Copies of this patent may be obtained for five cents each, by addressing the "Commissioner of Patents, Washington, D. C."